A. GEIGER.
Vapor Burner.
No. 294, A. I. Patented Aug. 14, 1860.
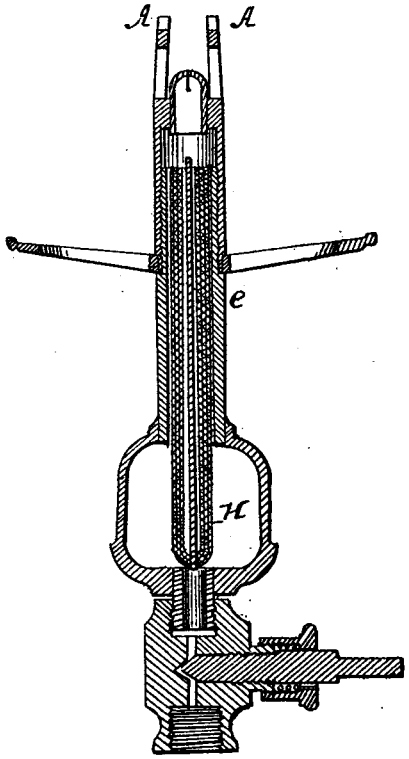
Witnesses
J. H. Alexander
Wm A Hughes
Inventor
Albertus Geiger
N. PETERS, Photo-Lithographer, Washington, D. C.

DEPARTMENT OF COMMERCE
UNITED STATES PATENT AND TRADEMARK OFFICE

---

MISSING PAGE(S)

PATENT NUMBER AI 294 FOR THE ISSUE DATE 08/14/1860 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims